April 14, 1936.  H. A. PHAIL  2,037,176
AIR REGISTER GRID
Filed Feb. 24, 1933
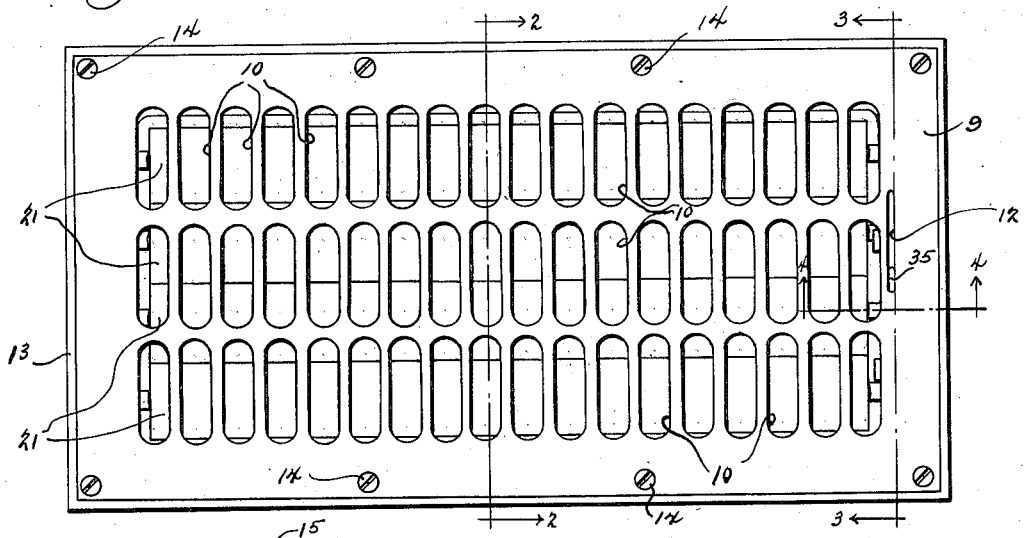
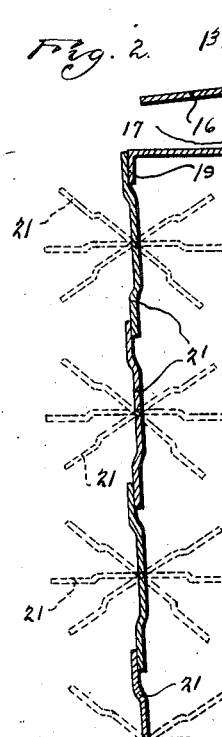
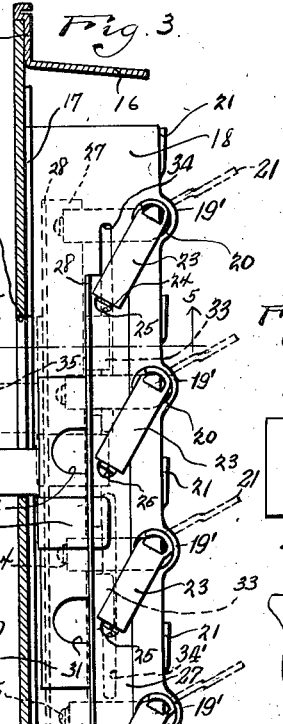
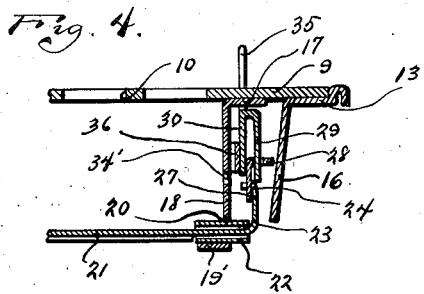
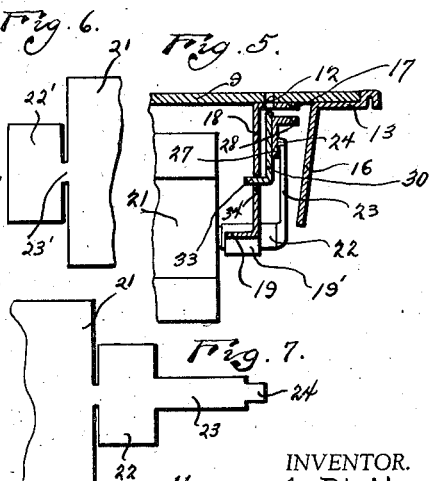
INVENTOR.
Herman A. Phail
BY
ATTORNEY.

Patented Apr. 14, 1936

2,037,176

UNITED STATES PATENT OFFICE 2,037,176

AIR REGISTER GRID

Herman A. Phail, Detroit, Mich.

Application February 24, 1933, Serial No. 658,351

2 Claims. (Cl. 98—107)

My invention relates to a new and useful improvement in a register grid adapted for use on warm air heating ducts, ventilating ducts and similar conduits which open into room and which it is desirable at times to regulate and control.

It is an object of the present invention to provide in a grid of this class a shutter arrangement in which the shutter elements may be moved to extend downwardly, horizontally or upwardly so as to direct the currents of air passing from the grid either downwardly, horizontally outwardly therefrom, or upwardly.

Another object of the invention is the provision in a grid of this class of a shutter actuating mechanism whereby the shutter may be swung to these various positions and the mechanism easily and quickly operated.

Another object of the invention is the provision of a device of this class which will be simple in structure, economical to manufacture, durable, and highly efficient in use.

Other objects will appear hereinafter.

The invention consists in the combination and arrangement of parts hereinafter described and claimed.

The invention will be best understood by a reference to the accompanying drawing which forms a part of this invention, and in which, Fig. 1 is a front elevational view of the invention.

Fig. 2 is a sectional view taken on line 2—2 of Fig. 1.

Fig. 3 is a sectional view taken on line 3—3 of Fig. 1.

Fig. 4 is a fragmentary sectional view taken on line 4—4 of Fig. 1.

Fig. 5 is a fragmentary sectional view taken on line 5—5 of Fig. 3, with the mechanism shown in the dotted line position of Fig. 3.

Fig. 6 is a fragmentary plan view of an end of one of the shutters.

Fig. 7 is a fragmentary plan view of the other end of the shutter.

The invention comprises a flat plate 9 having vent openings 10 formed therein and having a vertically extended slit 12 formed therein. The plate 9 adjacent each of its edges engages with the frame forming plate 13 and is secured thereto by the screws 14. A bead is formed along the edges of the plate 13 by doubling the plate upon itself as at 15. This frame forming plate 13 is angularly turned at its lower edge to provide the inward or rearwardly extending flange or plate 16.

The plate 9 also engages the frame forming plate 17 to which it is welded or otherwise suitably secured. This frame forming plate 17 has the rearwardly extending portion 18 which terminates in an angularly turned edge 19 which serves as a shutter supporting flange. Formed in this portion 18 are spaced openings 20 at each of which the flange 19 is outwardly bulged as at 19' as clearly appears in Fig. 3. A plurality of shutters 21 are mounted on the shutter supporting portion and each of these shutters terminates, at one end, in a centrally located, outwardly positioned tongue 23 having the outer end thereof reduced as at 24. Projecting outwardly from the tongue 23 adjacent the end of the shutter 21 are lateral wings or tongues 22 which are curled around the axis of the tongue 23 to provide a cylindrical bearing which extends through the opening 20. The other end of the shutter is formed as shown in Fig. 6 with lateral tongues or wings 22' which are curled upon the axis of the extension 23' to form a cylindrical bearing. As shown in Fig. 4, the tongue 23 is bent laterally and the reduced tongue 24 is again angularly turned to project through an opening 25 formed in an actuating plate 27 having the angularly turned edge 28 which extends at right angles to the plate 27. This angularly turned portion 28 is provided with a slot through which extends a tongue 29 punched from and doubled over in offset relation to a plate 30. This plate 30 is provided with spaced openings 31 and 32 at locations so that the tongues 24 projecting through the plate 27 may have clearance in the rocking of the shutters. The plate 30 is provided adjacent each end with an angularly turned tongue 33 which rides in either one of the slots 34 or 34' formed in the plate 18 at one of the sides of the frame. The plate 30 is also provided with a tongue or lever 35 which projects outwardly through the slot 12 and serves to form a finger grip whereby the shutters may be rocked. A spring or resilient plate 36 lies between the plates 18 and 30 and serves to maintain the plate 30 pressed outwardly so that the plate 27 is pressed outwardly to prevent disengagement of the lug forming portions 24 from the openings 25.

In operation a sliding of the lever or finger grip 35 from one end of the slot to the other will effect a rocking of the shutters from the closed position shown in Fig. 2 to the dotted line positions shown in Fig. 2 so that the air issuing from the grid may be deflected downwardly, horizontally or upwardly. This rocking of the shutters is effected by a sliding of the plate 30 transversely of the frame or longitudinally of itself. As the plate 30 is moved longitudinally, the shutters are rocked because of their connection through the tongues 24 to the plate 27 which is connected to the plate 30 by means of the tongue 29 which projects through the slot formed in the portion 28 of the plate 27. The engagement of the tongues 33 in the slots 34 and 34' serve to guide the plate 30 as it is moved by means of the finger grip or lever 35 transversely of the frame 18.

The shutters in swinging to their various positions will cause the ends 24 of the tongues 23 to swing past center and consequently it is necessary that the plate 27 move inwardly and outwardly of the plate 17. This inward and outward movement of the plate 27 causes a riding of the same inwardly and outwardly on the tongue 29 as shown in dotted lines in Fig. 3. By this mounting it becomes possible to swing the shutters to the various positions and an easy operation of the shutters is possible at all times.

With a grid of this nature having a shutter mechanism so arranged and constructed, it becomes possible to direct the currents of air in any direction desired so that the device may be used as a shutter closure at the end of a warm air conduit, a cool air conduit used for cooling purposes, or on a ventilator conduit.

While I have illustrated and described the preferred form of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. A device of the class described comprising; a supporting frame, a plurality of shutters rockably mounted on said frame and forming a closure therefor; a longitudinally and transversely movable operating plate; a crank arm on each of said shutters and pivotally connecting at its end to said operating plate; a longitudinally movable actuating plate; an angularly turned portion on said operating plate having a slot formed therein; and a tongue on said actuating plate projecting through said slot formed in said angularly turned portion; and means for moving said actuating plate longitudinally, said actuating plate effecting a longitudinal moving of said operating plate said operating plate being movable transversely of said actuating plate.

2. A device of the class described comprising: a supporting frame; a plurality of shutters rockably mounted on said frame and forming a closure therefore; a longitudinally and transversely movable operating plate; a crank arm on each of said shutters pivotally connecting at its end to said plate, a longitudinal movement of said plate effecting, through said arms, a rocking of said shutters, said plate being movable transversely of its length sufficiently for operating said shutters on opposite sides of the dead center; and an actuating member for moving said plate longitudinally while permitting free transverse movement of said plate, said actuating member having spaced openings formed in one of its edges and forming clearances for said crank arms upon swinging of the same past dead center.

HERMAN A. PHAIL.